United States Patent
Steele et al.

(10) Patent No.: US 7,603,841 B2
(45) Date of Patent: Oct. 20, 2009

(54) VORTEX COMBUSTOR FOR LOW NOX EMISSIONS WHEN BURNING LEAN PREMIXED HIGH HYDROGEN CONTENT FUEL

(75) Inventors: Robert C. Steele, Woodinville, WA (US); Ryan G. Edmonds, Renton, WA (US); Joseph T. Williams, Kirkland, WA (US); Stephen P. Baldwin, Winchester, MA (US)

(73) Assignee: Ramgen Power Systems, LLC, Bellevue, WA (US)

( * ) Notice: Subject to any disclaimer, the term of this patent is extended or adjusted under 35 U.S.C. 154(b) by 702 days.

(21) Appl. No.: 11/365,969

(22) Filed: Feb. 28, 2006

(65) Prior Publication Data
US 2009/0113895 A1    May 7, 2009

Related U.S. Application Data

(63) Continuation-in-part of application No. 10/430,849, filed on May 5, 2003, now Pat. No. 7,003,961, which is a continuation-in-part of application No. 10/200,780, filed on Jul. 23, 2002, now Pat. No. 6,694,743.

(60) Provisional application No. 60/386,195, filed on Jul. 23, 2001.

(51) Int. Cl.
*F23R 3/18* (2006.01)
(52) U.S. Cl. .................. 60/39.465; 60/737; 60/749
(58) Field of Classification Search ............... 60/39.12, 60/749, 750, 737, 39.461, 39.11; 431/115, 431/346
See application file for complete search history.

(56) References Cited

U.S. PATENT DOCUMENTS 2,680,950 A    6/1954    Burch (Continued)

FOREIGN PATENT DOCUMENTS

WO    WO 9827330 A1    6/1998
WO    WO 0017492 A1    3/2000

OTHER PUBLICATIONS

Katta, V. and Roquemore, W. Numerical Studies on Trapped-Vortex Concepts For Stable Combustion. Presented at the ASME Turbo Asia Conference, Nov. 5-7, 1996, Jakarta, Indonesia.

(Continued)

*Primary Examiner*—Ted Kim
(74) *Attorney, Agent, or Firm*—R. Reams Goodloe, Jr.

(57) ABSTRACT

A trapped vortex combustor. The trapped vortex combustor is configured for receiving a lean premixed gaseous fuel and oxidant stream, where the fuel includes hydrogen gas. The trapped vortex combustor is configured to receive the lean premixed fuel and oxidant stream at a velocity which significantly exceeds combustion flame speed in a selected lean premixed fuel and oxidant mixture. The combustor is configured to operate at relatively high bulk fluid velocities while maintaining stable combustion, and low NOx emissions. The combustor is useful in gas turbines in a process of burning synfuels, as it offers the opportunity to avoid use of diluent gas to reduce combustion temperatures. The combustor also offers the possibility of avoiding the use of selected catalytic reaction units for removal of oxides of nitrogen from combustion gases exiting a gas turbine.

57 Claims, 5 Drawing Sheets

U.S. PATENT DOCUMENTS

| | | | |
|---|---|---|---|
| 2,688,371 A | 9/1954 | Del Pesaro | |
| 2,690,809 A | 10/1954 | Kerry | |
| 2,709,889 A | 6/1955 | Mount | |
| 2,709,895 A | 6/1955 | Mount | |
| 2,748,563 A | 6/1956 | Wiktor | |
| 2,784,551 A | 3/1957 | Karlby et al. | |
| 2,867,979 A | 1/1959 | Mullen, II | |
| 3,007,310 A | 11/1961 | Eisele | |
| 3,038,301 A | 6/1962 | Carlson | |
| 3,054,259 A | 9/1962 | Arthur | |
| 3,118,277 A | 1/1964 | Wormser | |
| 3,325,993 A | 6/1967 | Gulyas | |
| 3,455,108 A | 7/1969 | Clare et al. | |
| 3,722,216 A | 3/1973 | Bahr et al. | |
| 3,727,409 A | 4/1973 | Kelley et al. | |
| 3,729,930 A | 5/1973 | Williams | |
| 3,818,696 A | 6/1974 | Beaufrere | |
| 3,831,375 A * | 8/1974 | Richard et al. | 60/749 |
| 3,864,907 A | 2/1975 | Curran | |
| 3,880,571 A | 4/1975 | Koppang et at. | |
| 3,971,209 A | 7/1976 | De Chair | |
| 4,024,705 A | 5/1977 | Hedrick | |
| 4,048,797 A | 9/1977 | Hakluytt et al. | |
| 4,066,381 A | 1/1978 | Earnest | |
| 4,197,869 A | 4/1980 | Moncrieff-Yeates | |
| 4,350,009 A | 9/1982 | Holzapfel | |
| 4,389,185 A | 6/1983 | Alpkvist | |
| 4,455,839 A * | 6/1984 | Wuchter | 60/749 |
| 4,586,443 A | 5/1986 | Burge et al. | |
| 4,641,495 A | 2/1987 | Mowill | |
| 4,702,073 A | 10/1987 | Melconian | |
| 4,728,282 A | 3/1988 | May | |
| 4,996,837 A | 3/1991 | Shekleton | |
| 4,996,838 A | 3/1991 | Melconian | |
| 5,025,622 A | 6/1991 | Melconian | |
| 5,123,361 A | 6/1992 | Nieh et al. | |
| 5,161,945 A | 11/1992 | Clevenger et al. | |
| 5,372,005 A | 12/1994 | Lawlor | |
| 5,372,008 A | 12/1994 | Sood | |
| 5,619,855 A | 4/1997 | Burrus | |
| 5,647,215 A | 7/1997 | Sharifi et al. | |
| 5,657,632 A | 8/1997 | Foss | |
| 5,709,076 A | 1/1998 | Lawlor | |
| 5,791,148 A | 8/1998 | Burrus | |
| 5,791,889 A | 8/1998 | Gemmen et al. | |
| 5,809,769 A | 9/1998 | Richards et al. | |
| 5,839,283 A | 11/1998 | Dobbeling | |
| 5,857,339 A | 1/1999 | Roquemore et al. | |
| 5,983,622 A | 11/1999 | Newburry et al. | |
| 6,082,111 A | 7/2000 | Stokes | |
| 6,263,660 B1 | 7/2001 | Lawlor | |
| 6,279,309 B1 | 8/2001 | Lawlor et al. | |
| 6,286,298 B1 | 9/2001 | Burrus et al. | |
| 6,286,317 B1 | 9/2001 | Burrus et al. | |
| 6,295,801 B1 | 10/2001 | Burrus et al. | |
| 6,334,298 B1 | 1/2002 | Aicholtz | |
| 6,334,299 B1 | 1/2002 | Lawlor | |
| 6,374,615 B1 | 4/2002 | Zupanc et al. | |
| 6,481,209 B1 | 11/2002 | Johnson et al. | |
| 6,694,743 B2 | 2/2004 | Lawlor | |
| 6,796,130 B2 | 9/2004 | Little et al. | |
| 7,003,961 B2 | 2/2006 | Kendrick | |
| 2002/0112482 A1 | 8/2002 | Johnson et al. | |
| 2004/0016235 A1 | 1/2004 | Lawlor | |
| 2004/0020211 A1 | 2/2004 | Kendrick et al. | |
| 2006/0107667 A1 * | 5/2006 | Haynes et al. | 60/737 |

OTHER PUBLICATIONS

Sturgess, G.J., and Hsu, K. Entrainment of Mainstream Flow In A Trapped-Vortex Combustor. AIAA 97-0261. Innovative Scientific Solutions, Inc., Beavercreek, Ohio, 35th Aerospace Sciences Meeting & Exhibit, Jan. 6-10, 1997, Reno Nevada.

Katta, V. and Roquemore, W.M.. Numerical Studies on Trapped-Vortex Concepts for Stable Combustion. Transactions of the ASME, vol. 120, Jan. 1998.

Katta, V. and Roquemore, W.M.. Study On Trapped-Vortex Combustor—Effect of Injection on Flow Dynamics. Journal of Propulsion and Power, vol. 14. No. 3, May-Jun., 1998. Presented as Paper 97-3256 at the AIAA/ASME/SAE/ASEE 33rd Joint Propulsion Conference and Exhibit, Seattle Washington, Jul. 1997.

Hsu, K and Roquemore, W. Characteristics of a Trapped Vortex Combustor. Journal of Propulsion and Power, vol. 14, No. 1, Jan.-Feb., 1998. Presented as Paper No. 95-0810 at the AIAA 33rd Aerospace Sciences Meeting, Reno, Nevada, Jan. 1995.

Sturgess, G.J., and Hsu, K. Combustion Characteristics of a Trapped Vortex Combustor. Paper presented at the RTO AVT Symposium on "Gas Turbine Engine Combustion, Emissions and Alternative Fuels", Lisbon, Portugal, Oct. 12-16, 1998 and published in RTO MP-14.

Hsu, K; Carter, C.D. et al. Characteristics of Combustion InstabilityAssociated with Trapped-Vortex Burner. Air Force Research Laboratory, Wright-Patterson AFB, OH; 37th AIAA Aerospace Sciences Meeting & Exhibit; Jan. 11-14, 1999, Reno Nevada.

Stone, C. and Menon, Suresh. Simulation of Fuel-Air Mixing and Combustion In A Trapped-Vortex Combustor. School of Aerospace Engineering, Georgia Institute of Technology; 38th AIAA Aerospace Sciences Meeting & Exhibit; Jan. 10-13, 2000, Reno Nevada.

Roquemore, W.M.; Shouse, Dale. et al. Trapped Vortex Combustor Concept for Gas Turbine Engines. AIAA 2001-0483; 39th AIAA Aerospace Sciences Meeting & Exhibit; Jan. 8-11, 2001, Reno Nevada.

Burrus, D.L, Johnson, A.W. et al. Performance Assessment Of A Prototype Trapped Vortex Combustor Concept for Gas Turbine Application. 2001-GT-0087. Proceedings of ASME Turbo Expo 2001, Jun. 4-7, 2001, New Orleans, Louisiana.

Straub, D., Casleton, K. et al. Assessment of Rich-Quench-Lean Trapped Vortex Combustor for Stationary Gas Turbines. U.S. Department of Energy, National Energy Technology Laboratory, Morgantown, WV. ASME GT2003-38569 Draft. Proceedings of ASME Turbo Expo 2003, Power for Land, Sea and Air, Jun. 16-19, 2003, Atlanta, Georgia.

* cited by examiner

US 7,603,841 B2

VORTEX COMBUSTOR FOR LOW NOX EMISSIONS WHEN BURNING LEAN PREMIXED HIGH HYDROGEN CONTENT FUEL

RELATED PATENT APPLICATIONS

This patent application is a continuation-in-part of, and claims the benefit of priority from prior U.S. patent application Ser. No. 10/430,849, filed May 5, 2003, which issues on Feb. 28, 2006 as U.S. Pat. No. 7,003,961B2; that application claimed the benefit of priority from prior U.S. patent application Ser. No. 10/200,780, filed on Jul. 23, 2002, which has matured into U.S. Pat. No. 6,694,743 B1, issued Feb. 24, 2004; that application claimed the benefit of priority from U.S. Provisional Patent Application Ser. No. 60/386,195, filed Jul. 17, 2002, which was converted on Jul. 17, 2002 from originally filed U.S. Non-Provisional patent application Ser. No. 09/912,265 filed on Jul. 23, 2001. The disclosures of each of the above patents and patent applications, including the specification, claims, and figures of the drawing, are each incorporated herein in their entirety by this reference.

STATEMENT OF GOVERNMENT INTEREST

This invention was made with United States Government support under Contract No. DE-FC026-00NT40915 awarded by the United States Department of Energy. The Government has certain rights in the invention.

TECHNICAL FIELD

This invention relates to burners and combustors, including high efficiency combustors for gas turbine engines, as well as to process applications for gas turbine engines utilizing such combustors.

BACKGROUND

The development of novel or improved processes for combustion of high hydrogen content fuels has become increasingly important in view of the development of various integrated power generation and fuel synthesis processes, especially where such processes produce fuels with significant hydrogen content. Commercially available gas turbines have typically been developed for the combustion of natural gas, i.e., a methane-rich fuel with high calorific values in the range of from about 800 to about 1200 BTU/scf (British Thermal Units per standard cubic foot, wherein standard conditions are 14.73 pounds per square inch absolute and 60° F.). While such gas turbines have been adapted to burn certain syngas fuels, and more specifically fuels with low calorific value often in the range of from about 100 to about 300 BTU/scf, gas turbine combustor design features have not generally been optimized for hydrogen content or low grade gaseous fuel applications.

Conventional gas turbine engines encounter two basic difficulties when transitioning from natural gas to syngas. First, for the same fuel heat input, the mass flow of a syngas fuel is often four to five times greater than that for natural gas, due to the lower heating value of the syngas fuel. Second, although premixed natural gas and air combustion systems have become common place for controlling NOx emissions, such systems have not been successfully implemented for syngas applications, due to the high hydrogen content of the syngas, and the accompanying potential for flashback of the flame into the fuel injection system. Consequently, diffusion flame or "non-premixed" combustors which have been used in the combustion of syngas have been configured to control the NOx emissions by diluting the syngas with nitrogen, steam or carbon dioxide. In such designs, the diluent reduces the flame temperature and consequently reduces the formation of NOx.

In the combustion of natural gas, dry (i.e., no addition of steam or water) low NOx (DLN, or "Dry Low NOx") combustors can achieve less than 10 ppmvd (10 parts per million by volume, dry, at 15% Oxygen) NOx emissions with a natural gas fuel. Such DLN combustors rely on the premix principle, which reduces the combustion flame temperature, and consequently the NOx emissions. DLN combustors are able to achieve much lower NOx emissions than diluted non-premixed combustors because of higher premixing time prior to the combustion zone.

In high hydrogen content fuel, such as is found in some syngas mixtures (up to 60% hydrogen by volume or more), or in pure hydrogen fuel sources, the flame speeds may be up to as much as six times faster than the flame speed that is typical in combustion of natural gas. Consequently, such high flame speed mixtures, whether from syngas based fuels or from other hydrogen source fuels, makes the use of a DLN combustion system impossible, because in such a system the flame would flash back into the premix zone, and destroy the fuel injection hardware.

On the other hand, the diluted non-premixed combustors have a chemical kinetic limit when too much diluent is added for reduction of NOx emissions. The increase in diluent causes flame instability in the combustion zone, and eventually, combustor flame-out. Consequently, in the best case, a practical NOx reduction limit for prior art syngas combustors is presently between about 10 and about 20 ppmvd NOx.

In summary, there remains an as yet unmet need for a combustor for a gas turbine engine that may be utilized for the combustion of high hydrogen content fuels. In order to meet such needs and achieve such goals, it is necessary to address the basic technical challenges by developing new system designs. As described herein, advantageous gas turbine system designs may include the use of a lean premix with high hydrogen content fuels in combination with the use of trapped vortex combustors.

BRIEF DESCRIPTION OF THE DRAWING

The present invention will be described by way of exemplary embodiments, illustrated in the accompanying drawing in which like reference numerals denote like elements, and in which.

The foregoing figures, being merely exemplary, contain various elements that may be present or omitted from actual embodiments which may be implemented, depending upon the circumstances. An attempt has been made to draw the figures in a way that illustrates at least those elements that are significant for an understanding of the various embodiments and aspects of the invention. However, various other elements of a novel trapped vortex combustor, and methods for employing the same in the combustion of high flame speed fuels such as hydrogen rich syngas, may be utilized in order to provide a versatile gas turbine engine with novel trapped vortex combustor for combustion of a fuel-air premix while minimizing emissions of carbon monoxide and oxides of nitrogen.

DETAILED DESCRIPTION

Figure 1:
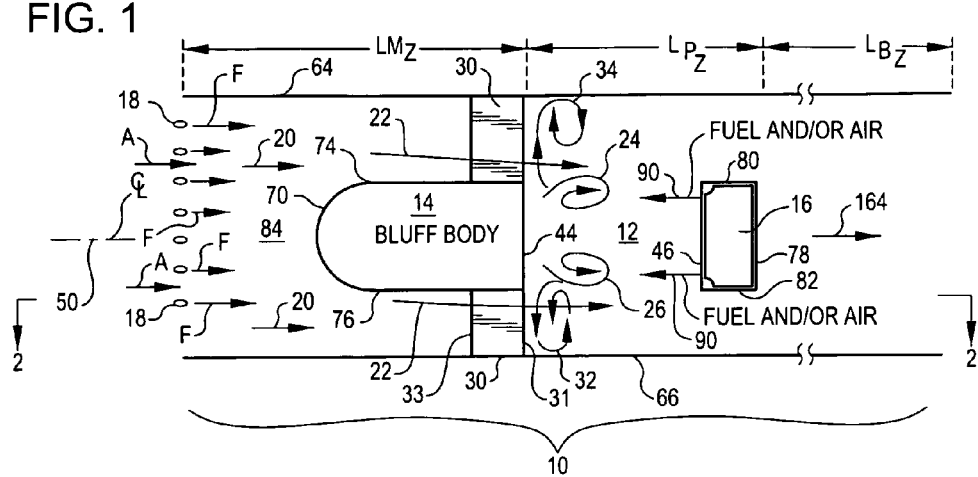
FIG. 1 provides a plan view of a novel trapped vortex combustor, illustrating the pre-mixing of fuel such as a hydrogen rich fuel and oxidant, as well as the use of laterally extending mixing struts that enable combustion gases from the trapped vortex to mix with the incoming fuel-air premix.

As depicted in FIG. 1, a novel trapped vortex combustor 10 design has been developed for operation in a low NOx, lean premixed mode on hydrogen-rich fuels, yet accommodates the high flame speed that is a characteristic of such fuels. In some embodiments, such a combustor 10 can achieve extremely low NOx emissions without the added capital and operating expense of post-combustion treatment of the exhaust gas. Further, such a combustor 10 can eliminate the costly requirement for high pressure diluent gas (nitrogen, steam or carbon dioxide) for NOx emissions control.

As easily seen in FIG. 1, in the novel trapped vortex combustor 10 design disclosed herein, at least one cavity 12 is provided, having a selected size and shape to stabilize the combustion flame for a selected fuel composition. Flame stabilization is accomplished by locating a fore body, hereinafter identified as first bluff body 14, upstream of a second, usually smaller bluff body—commonly referred to as an aft body 16. Fuel F, such as a hydrogen rich syngas, is provided by fuel outlets 18, and the fuel F is mixed with incoming compressed oxidant containing stream A, which oxidant containing stream A may be a compressed air stream containing both oxygen and nitrogen (or in other embodiments, another inert working fluid, such as steam or carbon dioxide). The in-flow of bulk fluid continues in the direction of fluid flow reference numeral 20, ultimately providing a lean fuel-air premixed stream 22 for entry to the combustion zone that occurs at or adjacent cavity 12. Fluid flow issuing from around the first bluff body 14 separates, but instead of developing shear layer instabilities (that in most circumstances becomes the prime mechanism for initiating flame blowout), an alternating array of vortices 24 and 26 are conveniently trapped or locked between the first 14 and second 16 bluff bodies.

In some embodiments of the novel trapped vortex combustor 10 design disclosed herein, the re-circulation of hot products of combustion into the incoming, lean premixed fuel and oxidant mixture stream 22 may be accomplished by incorporating various features. In one embodiment, a stable recirculation zone may be generated in on or more vortices, such as vortices 24 and 26, located adjacent to the main fuel-air flow. When the fluid flow in the vortex or cavity 12 region is designed properly, the flow of the swirling combustion gases comprise one or more vortices that are stable, at least with respect to the one or more primary trapped vortices, and vortex shedding is substantially avoided. Each of the one or more stable primary vortices are thus used as a source of heat, or more precisely, a source of hot products of combustion. Further, heat from the vortex or cavity 12 region must be transported into the main entering lean premix fuel and oxidant mixture stream, and mixed into the main flow. As shown in FIG. 1, in one embodiment, this may be done in part by escape of a portion of combustion gases from the vortices 24 and 26 in cavity 12 outward in the direction of the incoming lean premixed fuel and oxidant stream flow 22. In one embodiment, such mixing may be accomplished by using structures to create a flow of combustion gases having a substantial transverse component. In this way, structures such as struts 30 create stagnation zones, from which mixing occurs, such as via wakes 32 or 34, for example, as seen in FIG. 1. In such embodiments, the incoming lean premixed fuel and oxidant mixture 22 is at least in part, if not primarily, ignited by lateral mixing, instead of solely by a back-mixing process. In some embodiments, at least one pair of struts 30 may be provided. Similarly, at least one of the at least one pair of struts 30 may include a rear planar portion 31, as can be appreciated from FIG. 2. From FIGS. 1 and 2, it can be seen that in some embodiments, the planar rear portion 31 may be oriented coplanar with the rear wall 44 of the first bluff body 14. Further one or more of the struts 30 may include an upstream portion 33 shaped for low aerodynamic drag.

In any event, by providing suitable geometric features such as struts 30, there is provided in the trapped vortex combustor 10 at least some lateral or transverse flow of hot gases, to provide lateral mixing to ignite the incoming fuel-air mixture. By using such structures as struts 30 in a mixing technique, the novel trapped vortex combustor 10 design disclosed herein is believed less sensitive to flame instabilities and other process upsets. This is particularly important when operating near the lean flame extinction limit, where small perturbations in the fluid flow can lead to flame extinction.

Thus, in the novel trapped vortex combustor design disclosed herein, the very stable yet highly energetic primary/core flame zone is very resistant to external flow field perturbations, and therefore yields extended lean and rich blowout limits relative to a dump combustor having a simple bluff body component. The unique characteristic of the presently described novel trapped vortex combustor technology provides a fluid dynamic mechanism that can overcome the high flame speed of a hydrogen-rich gas, and thus has the capability to allow combustors to operate with a hydrogen rich gaseous feed stream with a lean fuel-air premix composition.

In one embodiment, the novel trapped vortex combustor design configuration described herein also has a large flame holding surface area, and hence can facilitate the use of a compact primary/core flame zone, which is essential to promoting high combustion efficiency and reduced CO emissions.

Figure 2:
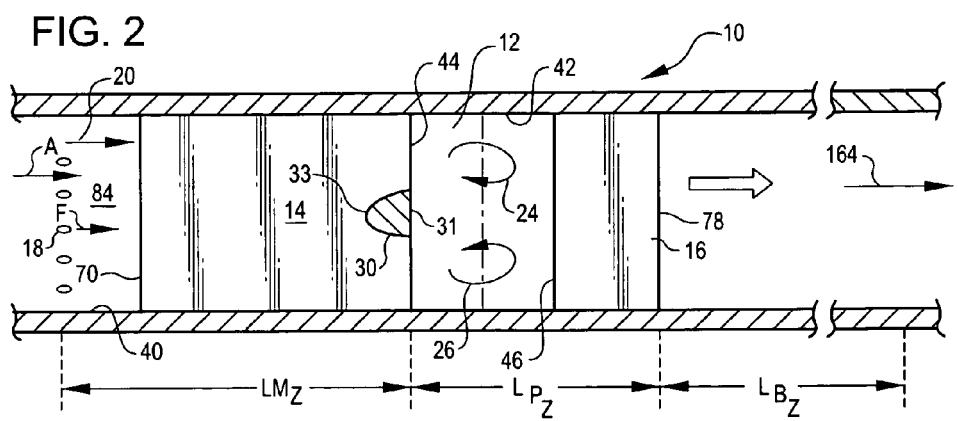
FIG. 2 provides an elevation view of an embodiment of a novel trapped vortex combustor configuration, taken along section 2-2 of FIG. 1, more clearly showing a first bluff body and a second or aft bluff body, which enables the setup of a stable vortex between the first and second bluff bodies for the combustion of a lean premixed fuel and oxidant mixture, as well as the use of laterally extending struts to promote mixing of the entering premix with hot gases that are escaping from a stable vortex between the first bluff body and a second bluff body.
Figure 3:
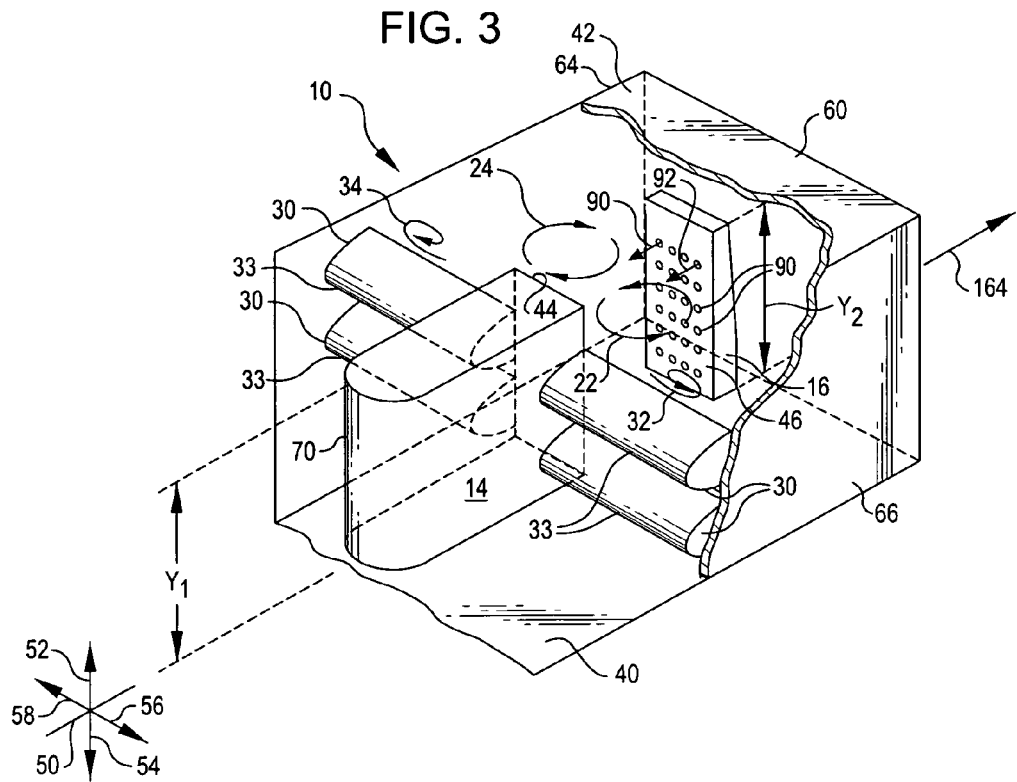
FIG. 3 provides a perspective view of an embodiment of a novel trapped vortex combustor, showing a circulating main vortex similar to that first illustrated in FIG. 1, now showing the use of multiple laterally extending mixing devices, here depicted in the form of partially airfoil shaped outwardly or laterally extending mixing devices extending into the bulk lean premixed fuel and oxidant flow adjacent the dump plane of the combustor.

As noted in FIGS. 2 and 3, in one embodiment, the trapped vortex combustor 10 includes a base 40. The first bluff body 14 extends outward from the base 40 for a height or distance of $Y_1$, and the second bluff body 16 extends outward from the base for a height or distance of $Y_2$. In one embodiment, $Y_1$ is equal to $Y_2$, and the combustor 10 also includes a ceiling 42, so that during operation, a stabilized vortex of mixing and burning gas 12 is trapped between the rear wall 44 of the first bluff body 16 and the front wall 46 of the second bluff body 16, and between base 40 and ceiling 42.

In one embodiment, as noted in FIG. 3, between the rear wall 44 of the first bluff body 14 and the front wall 46 of the second bluff body 16, at least a portion of the gas from each stabilized vortex 24 and 26 of mixing and burning gas moves in the bulk fluid flow direction, i.e., the same direction as the premixed fuel and oxidant mixture stream flow 22 shown in FIG. 1. Also, in one embodiment, as noted in FIG. 3, between the rear wall 44 of the first bluff body 14 and the front wall 46 of the second bluff body 16, at least a portion of each stabilized vortex of mixing and burning gas 24 and 26 moves in a direction opposite the bulk fluid flow direction, i.e., opposite the direction as the premixed fuel and oxidant mixture inflow 22 shown in FIG. 1.

As better seen in FIGS. 1 and 2, in one embodiment, the novel trapped vortex combustor 10 further comprises one or more outwardly extending structures such as struts 30. In some embodiments, struts 30 may include a planar rear portion 31. In some embodiments, the rear planar portion 31 may be substantially co-planar with the rear wall 44 of the first bluff body 14. As seen in FIG. 3, in some embodiments, one or more struts 30 may be provided. In some embodiments, multiple struts 30 may be provided in a configuration where they extend outwardly from adjacent the rear wall 44 of the first bluff body 14. In some embodiments, the struts 30 may extend transversely with respect to longitudinal axis 50, or may include at least some transverse component, so that circulation of a portion of escaping heat and burning gases flow adjacent struts 30 and are thus mixed with an incoming lean premixed fuel and oxidant mixture.

As generally shown in FIGS. 1 through 3, and specifically referenced in FIG. 3, a novel trapped vortex combustor 10 can be provided wherein the combustor 10 has a central longitudinal axis 50 see FIG. 1) defining an axial direction. For reference, a combustor may include, extending along the longitudinal axis 50, a distance outward toward the ceiling 42 along an outward direction 52, or alternately in an inward, base direction 54 both oriented orthogonal to the axial direction. Also for reference, a trapped vortex combustor 10 may include, space extending in a transverse direction 56 or 58, oriented laterally to the axial direction 50. A pressurizable plenum 60 is provided having a base 40, an outer wall or ceiling 42, and in some embodiments, combustor first and second sidewalls 64 and 66, respectively.

In some embodiments, the first bluff body 14 includes a nose 70 and opposing first 74 and second 76 bluff body sidewalls, as well as rear 44 noted above. The second bluff body 16 is located downstream from the first bluff body 16. The second bluff body has an upstream side having a front wall 46, a downstream side having a back wall 78, and first 80 and second 82 opposing sidewalls.

As seen in FIGS. 1 and 2, a mixing zone 84 is provided downstream of the gaseous fuel inlets 18. The mixing zone 84 is upstream of the rear wall 44 of the first bluff body 14. The mixing zone 84 has a length $LM_Z$ along the axial direction 50 sufficient to allow mixing of fuel and oxidant, and particularly gaseous fuel and gaseous oxidant, to form a lean premixed fuel and oxidant stream 22 having an excess of oxidant. The pressurizable plenum 60, first bluff body 14, and second bluff body 16 are size and shaped to receive the lean premixed fuel and oxidant mixture stream 22 at a velocity greater than the combustion flame speed in the lean premixed fuel and oxidant mixture 22 composition. Once the cavity 12 is reached, flow wise, a primary combustion zone of length $LP_Z$ is provided, wherein one or more stabilized vortices 26 and 26 are provided to enhance combustion of the entering fuel. After the aft bluff body 16, combustion burnout zone of length $LB_Z$ is provided, of sufficient length so that final hot combustion exhaust gases, described below, meet the desired composition, especially with respect to minimizing the presence of carbon monoxide.

As seen in FIGS. 1 and 3, in some embodiments, the second bluff body 16 is further configured to provide one or more vortex stabilization jets 90. Each of the one or more vortex stabilization jets 90 provides an upstream jet of gas in a direction tending to stabilize vortex 22 and vortex 24 in the cavity 12 between the first bluff body 14 and the second bluff body 16. In one embodiment, the second bluff body 16 is coupled to a source of fuel, and in such a case, at least one of the vortex stabilization jets provides an injection stream containing a fuel. In such an embodiment, the second bluff body 16 may be coupled to a source of syngas, and in such a case, the fuel comprises a syngas. In yet other embodiments, the second bluff body 16 is coupled to a source of oxidant, and in such cases, one or more of the at least one vortex stabilization jets 90 has an injection jet stream containing an oxidant. In yet another embodiment, the vortex stabilization jets may include a first jet 90 containing a fuel, and a second jet 92 containing an oxidant. In a yet further embodiment, the vortex stabilization jets may be used in a process where the second bluff body 16 is coupled to a source of lean premixed fuel and oxidant, and wherein a stream comprising lean premixed fuel and oxidant is injected through at least one of the one or more vortex stabilization jets 90.

In any event, the novel trapped vortex combustor 10 includes first 14 and second 16 bluff bodies that are spaced apart in a manner that when the trapped vortex combustor 10 is in operation, the heat and combustion products produced during combustion of the lean premix are continuously recirculated in a recirculation zone in the cavity 12 between the first 14 and second 16 bluff bodies, and wherein heat and combustion products exit longitudinally (reference direction 50) and laterally (which may include transversely such as in reference directions 56 and 58) from the cavity 12 and are employed to continuously ignite a lean premixed fuel and oxidant mixture entering the tapped vortex combustor 10. In some embodiments, the lean premixed fuel an oxidant mixture enters adjacent cavity 12, from flow along side of walls 74 and 76 of first bluff body 14.

High hydrogen content fuels present a particular problem in that the flame speed during the combustion of a premixed stream of pure hydrogen gas and air is approximately six times (6×) that of the flame speed of a premixed stream of natural gas and air. Thus, in order to prevent flashback of a flame upstream from a combustor when burning premixed fuels containing hydrogen, the thru-flow velocity needs to be greater, and in some embodiments (depending upon the hydrogen content in the fuel mixture) significantly greater than the flame speed. Such problems are compounded in lean pre-mix combustor designs since flashback of the flame into the fuel injector may cause severe damage to the hardware, and has the clear potential, for example, to lead to gas turbine failure. As a result of such factors, in so far as we are aware, presently there are no lean pre-mix gas turbines in operation in industry on high hydrogen content fuels.

In our method of construction and operation of a suitable novel trapped vortex combustor 10, the bulk fluid velocity 20 entering the combustion zone adjacent trapped vortex 12 exceeds the flame speed of combustion occurring in the lean premix composition. In some embodiments, the bulk fluid velocity entering the novel trapped vortex combustor 10 exceeds the flame speed of combustion occurring in the lean premix by a factor of from about 3 to about 6 or thereabouts. Depending upon the actual gaseous composition, fuels containing significant amounts of hydrogen will have turbulent flame speeds from about thirty five (35) meters per second to about fifty (50) meters per second. Thus, in order to achieve desirable safety margins necessary when operating on hydrogen rich gaseous fuel, the bulk velocity 20 of lean premix may be provided at about one hundred five (105) meters per second, and up to as much as about one hundred fifty (150) meters per second, or more. Such bulk pre-mixed fuel velocities allow protection against flash back even when operating on high hydrogen content fuels, and thus are a significant improvement when applied as combustors in gas turbines.

In short, the novel trapped vortex combustor 10 described and claimed herein can provide a significant benefit in gas turbine designs for high hydrogen content fuels. Such fuels may be found in the syngas from coal gasification technology applications, such as Integrated Gasification Clean Coal ("IGCC") plants, or in Combined Cycle Gasification Technology ("CCGT") plants. Also, in some embodiments, the novel trapped vortex combustor 10 described and claimed herein may provide a significant benefit in the design and operation of equipment for the combustion of hydrogen rich streams in other systems.

Figure 4:
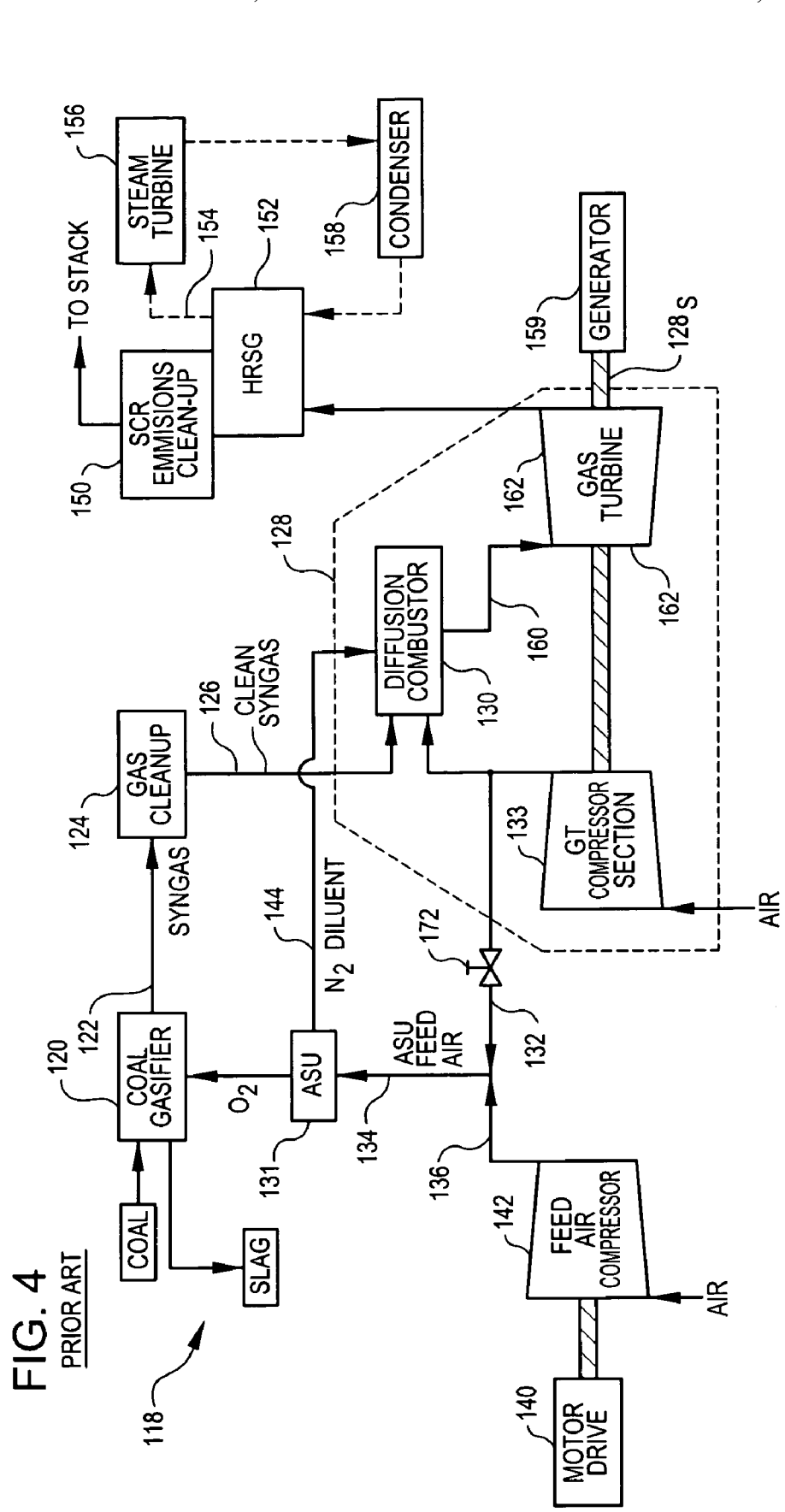
FIG. 4 provides a process flow diagram for a prior art Integrated Gasification Combined Cycle ("IGCC") process, showing the use of a diffusion combustor in a gas turbine, and the feed of compressed air from both the gas turbine compressor and from the motor driven compressor to an air separation unit for the production of oxygen and nitrogen, as well as the use of a selective catalytic reduction hot gas emissions cleanup process subsequent to the gas turbine.

As shown in FIG. 4, in a prior art clean coal process plant 118, oxygen-blown coal gasifiers 120 are utilized to generate a synthesis gas 122 that is rich in hydrogen and in carbon monoxide. Such synthesis gas 122 is typically cleaned in a gas cleanup unit 124, and the clean synthesis gas 126 is used as a fuel in a gas turbine 128. The synthesis gas 126 is typically burned in a diffusion combustor 130. The production of raw synthesis gas 122 thus requires an oxygen source, which is typically provided by way of a cryogenic air separation unit ("ASU") 131. Alternately, the oxygen source may be a high temperature ion transport membrane (not shown). As is illustrated in FIG. 4, in typical prior art process design, a portion 132 of the air 134 for the ASU 131 is provided by the compressor 133 of the gas turbine 128, and a portion 136 of the air 134 for the ASU 131 is provided by a separate motor 140 driven feed air compressor 142. The respective contribution of the gas turbine compressor 133 and the supplemental feed air compressor 142 is commonly referred to as the "degree of integration". The "degree of integration" varies with the specific plant designs, but the norm is approximately fifty percent (50%) integration, where half of the ASU 131 feed air 134 comes from the gas turbine compressor 133, and half of the ASU 131 feed air 134 comes from separate motor 140 drive (typically electric drive) feed air compressor(s) 142.

The heating value of typical cleaned synthesis gas ("syngas") 126 from an IGCC plant is normally below 250 BTU/scf, (British ThermalUnits per standard cubic foot) which is approximately one-fourth (¼) of the heating value of a typical natural gas supply. Stated another way, four (4) times the gaseous volume of clean syngas 126 fuel is required to be fed to a gas turbine 128 in order to generate the same power output that would be generated if the gas turbine 128 were, instead, fueled utilizing a typical natural gas supply.

Unfortunately, conventional swirl-stabilized lean pre-mix combustor designs cannot be used with a hydrogen-rich syngas 126 fuel because of concerns over the possibility of flame flashback in a hydrogen rich fuel, and over the possibility of auto-ignition in a high pressure pre-mix fuel/oxidant stream. Gas turbine manufacturers offer various conventional, non-pre-mix diffusion combustor 130 designs that have marginal emissions signatures. In such conventional prior art diffusion combustor 130 designs, nitrogen 144 is added as a diluent, in order to reach a desired NOx emissions level, such as a 25 ppm NOx emission level. In other, non-IGCC gas turbine applications, various other diluent gases such as $CO_2$ (carbon dioxide) and $H_2O$ (steam) can also used for NOx control, but with the same adverse, efficiency decreasing results. Note that in the typical IGCC plant 118 as conceptually depicted in FIG. 4, although nitrogen 144 diluent comes from the ASU 131 as a by-product of the air separation process, there may need to be, at extra capital cost and at extra operating expense, an additional diluent gas compressor (not shown).

For further treatment of the products of combustion to reduce oxides of nitrogen, a selective catalytic reduction ("SCR") system 150 may be used to reach a 3 ppm NOx emission value requirement, as is often established by regulation of applicable governmental authorities. In certain SCR systems 150, optimum reaction temperature for the SCR process may be provided by linking the SCR system 150 with the heat recovery steam generator ("HRSG") 152. The HRSG 152 may be utilized for recovery of heat and generation of steam 154 for use in a steam turbine 156 for shaft power, such as via shaft $156_s$ to an electric generator 157 (similar to configuration illustrated in FIG. 6) or for process use (not shown). In any event, condensed steam is collected at a condenser 158 and returned as condensate to the HRSG 152. Also, electrical power is generated via shaft $128_s$ power from gas turbine 128 that is used to turn generator 159. Where utilized, the above mentioned electrical generator 157 is driven by steam turbine 156.

In such prior art IGCC plants 118, the total combined gaseous products of combustion flow stream 160, from the added syngas fuel flow volume (up to four times or more by volume, compared to natural gas), and from the added nitrogen 144 diluent flow volume, creates a mass flow mismatch (and thus load mismatch) between the compressor section 133 and the turbine section 162 of a gas turbine 128 designed for use on a typical natural gas fuel. A higher mass flow rate through the turbine section 162 may increase the pressure at the compressor section 133 outlet too much, so that the compressor approaches, or if left unaddressed would encroach, a compressor surge region, where such total mass flow would no longer be sustainable. In various plant designs, such a mismatch is "managed" by adjusting the degree of integration, which usually means removal of at least a portion of the compressed air mass flow 132 to the ASU 131 from the gas turbine compressor 133. Alternately, a gas turbine manufacturer could add a compressor stage to allow higher overall pressure ratio in the compression cycle. Further, the high mass flow of syngas as compared to natural gas might approach the mechanical limits of a gas turbine rotor to handle turbine power output. Thus, while close coupling of the ASU 131 and the gas turbine 128 in an IGCC plant would seem to be synergistic, in prior art plant designs, there remain various workaround issues in plant design with respect to efficient combustion of syngas 126, such designs are subject to various capital cost penalties and/or system efficiency losses, whether from costs of the SCR system for NOx cleanup, or for load matching with respect to compressed air requirements, or from nitrogen 144 dilution practice.

Figure 5:
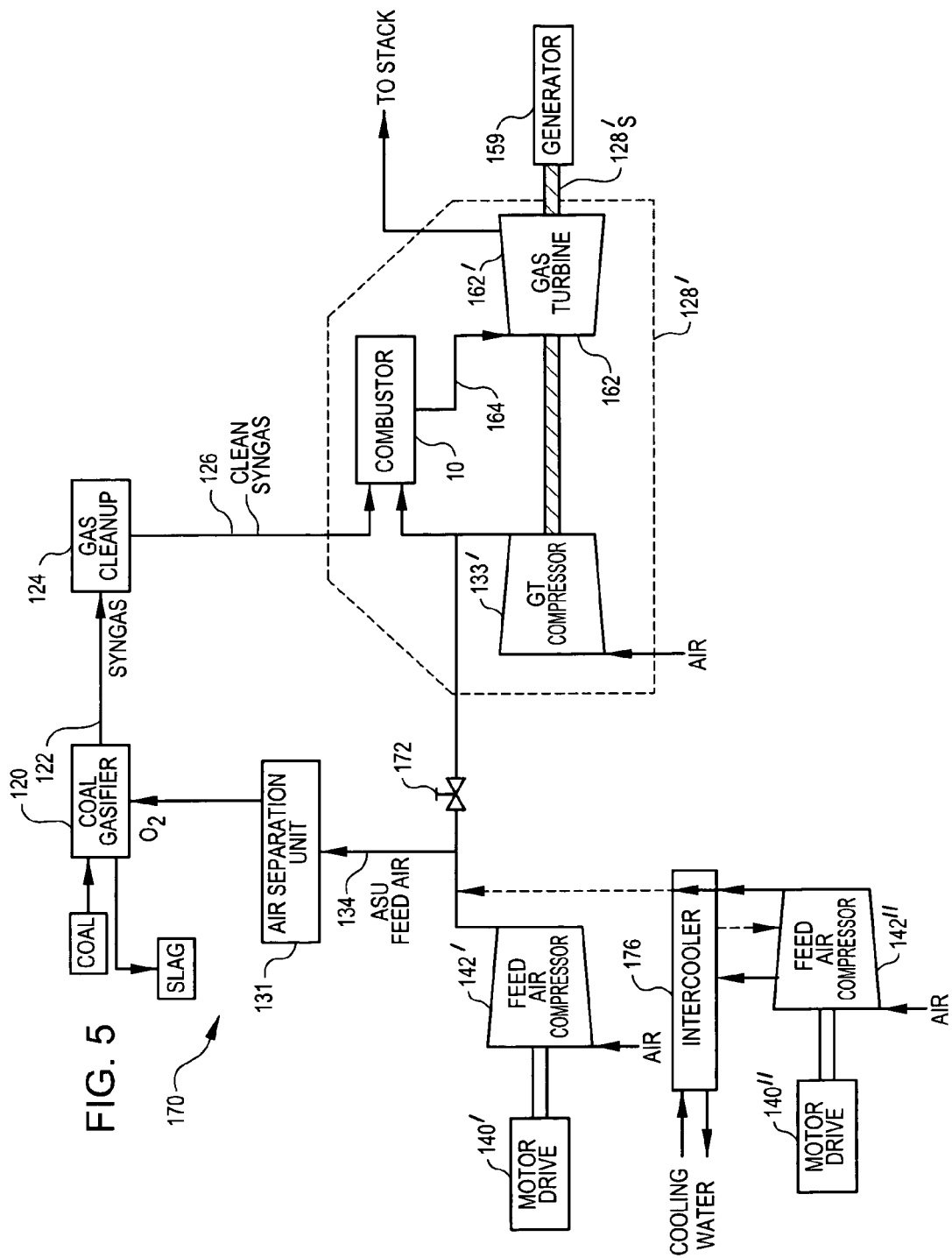
FIG. 5 provides a process flow diagram for an Integrated Gasification Combined Cycle ("IGCC") process similar to that first described in FIG. 4 above, but compared to the process shown in FIG. 4, now eliminates the use of diluent gas feed to the combustor, and the use of SCR emissions cleanup technology, both of which process steps may be eliminated from an IGCC plant via use of the novel trapped vortex combustor described and taught herein.

By comparison of FIGS. 4 and 5, it is particularly pointed out that the use of a novel trapped combustor 10 as described and claimed herein to produce a hot combustion exhaust gas stream 164 would allow the provision of an IGCC plant that eliminates the practice of use of nitrogen 144 dilution in burners, and that eliminates the use of an SCR system, whether in a high temperature embodiment for direct receipt of combustion gases from gas turbine 162' (not illustrated), or the use of an SCR system 150 (as shown in a low temperature embodiment in conjunction with the HRSG 152 as noted in FIG. 4).

As can be appreciated from FIG. 5, uncoupling of the gas turbine 128' compressor 133' with requirement for supply of the ASU 131 also offers the potential for savings in some fuel synthesis plants, by freeing up the compressor 133' so that the parasitic air compression load is reduced. Many of the gas turbine compressors currently available operate most efficiently at a pressure ratio of about twenty (20), which means that when compressing atmospheric air, there is about a three hundred (300) psia (pounds per square inch absolute) discharge pressure. However, since most ASU units 131 presently operate in the one hundred fifty pounds per square inch gauge (150 psig) range, excess compression work may sometimes take place in preparation of compressed air feed 134 for the ASU 131. However, if in the plant 170 design shown in FIG. 5, valve 172 is closed and all of the feed air 134 to the ASU 131 is provided using a 4-stage intercooled motor 140' driven compressor 142' operating at 282.2 psia discharge pressure, the total air compression costs would be less than the costs associated with the case shown in FIG. 4 where valve 172 is open and 50% of supply for the air separation unit 131 is provided via the gas turbine compressor 133 bleed air supply. Further, if all of the ASU 131 feed air were provided by a motor 140" driven intercooled multistage compressor 142" operating only at one hundred sixty four point seven (164.7) psia discharge pressure, then there would be a significant energy savings for the supply of compressed air to the ASU. Moreover, the gas turbine compressor 133' could in such a case be designed to solely handle the oxidant supply requirements to combustor 10 (or to handle compression of an oxidant and an inert working gas such as carbon dioxide or steam where such fluids are used to increase work output from turbine 162' of the gas turbine engine 128'), without regard to any integration requirements with the ASU air supply.

In any event, a novel trapped vortex combustor 10 can be adapted for use in, or in combination with, various types of gas turbines for the combustion of high hydrogen content fuels, especially such fuels from various types of fuel synthesis plants, such as carbonaceous matter gasification plants, including coal or coke gasification plants. In one embodiment, this may be made possible by decreasing the mass flow through the turbine section. Also, in one embodiment, a novel trapped vortex combustor 10 design can improve the overall cycle efficiency of a gas turbine, by decreasing the pressure drop through the trapped vortex combustor 10, as compared with a prior art diffusion combustor 30. And, such a novel trapped vortex combustor 10 design can extend the lean blowout limit while offering greater turndown, (i.e. load following capability), with improved combustion and process stability. In summary, a novel trapped vortex combustor 10 design holds tremendous promise for combustion of hydrogen rich fuels in various gas turbine 128' applications. Such a design offers improved efficiency, lower emissions levels, greater flame stability, increased durability, added fuel flexibility, and reduced capital costs, compared to prior art designs.

The novel trapped vortex combustor 10 described and claimed herein may be utilized in a variety of gaseous fuel synthesis plants that make hydrogen rich fuels. One such plant is an integrated gasification process, as conceptually depicted in FIGS. 5 and 6. In such processes, the gasification unit, shown as gasifier 120, produces a raw synthesis gas 122 from a carbonaceous feed 119, such as coke or coal, to produce a synthesis gas comprising CO and $H_2$, as well as other contaminants that vary according to the feed stock.

In a gaseous fuel synthesis process, the synthesis gas ("syngas") provided by the process may have at least fifteen (15) mole percent hydrogen gas. In other embodiments, the syngas provided by the process may have at least twenty five (25) mole percent hydrogen gas therein. Depending on feed stock, and the process employed, a synthesis gas provided by the process may have at least thirty (30) mole percent hydrogen gas. In yet other feed stocks or operating conditions, the synthesis gas may have at least fifty (50) mole percent hydrogen gas. In still other embodiments, the synthesis gas may have at least sixty five (65) mole percent hydrogen gas. In yet other embodiments, the synthesis gas may have at least seventy five (75) mole percent hydrogen gas, or more than seventy five (75) mole percent hydrogen. In some gaseous fuel synthesis plants, the synthesis gas may be provided at about one hundred (100) mole percent hydrogen.

When a carbonaceous feedstock such as a coal or coke feedstock is utilized in a gasification process, a raw synthesis gas may be cleaned at gas cleanup unit 124 to produce a clean synthesis gas 126. A gas turbine 128' is provided coupled to an electrical generator 159, for generating electrical power. The gas turbine engine 128' includes a compressor section 133', a turbine 162', and a novel trapped vortex combustor 10. The novel trapped vortex combustor 10 is sized and shaped for receiving a gaseous fuel F including gas resulting from the cleanup of the raw synthesis gas, via a fuel outlet 18 and a compressed oxidant containing stream A (see FIG. 1) and for mixing the gaseous fuel F and the compressed oxidant containing stream A to form a premixed fuel and oxidant stream 22 having a stoichiometric excess of oxidant. Then, the lean premixed fuel and oxidant stream 22 is fed to the novel trapped vortex combustor 10 at a bulk fluid velocity 20 in excess of the speed of a flame front in a premixed fuel and oxidant mixture stream of preselected composition.

As shown in FIG. 1, noted above, the novel trapped vortex combustor 10 includes a first bluff body 14 and a second bluff body 16. The combustion of the synthesis gas occurs at least in part in cavity 12 to produce a stabilized vortex 24 and 26 of mixed oxidant and burning synthesis gas between the first bluff body 14 and the second bluff body 16.

In some embodiments, the bulk premixed velocity 20 may be in the range of from about one hundred five (105) meters per second to about one hundred fifty (150) meters per second. The fuel F in the lean premixed stream 22 is combusted in the novel trapped vortex combustor 10, primarily at main vortex 12, to create a hot combustion exhaust gas stream 164. The turbine 162' is turned by expansion of the hot combustion exhaust gas stream 164, to produce shaft power, and the shaft 128'$_s$ turns the electrical generator 159 to produce electrical power.

Figure 6:
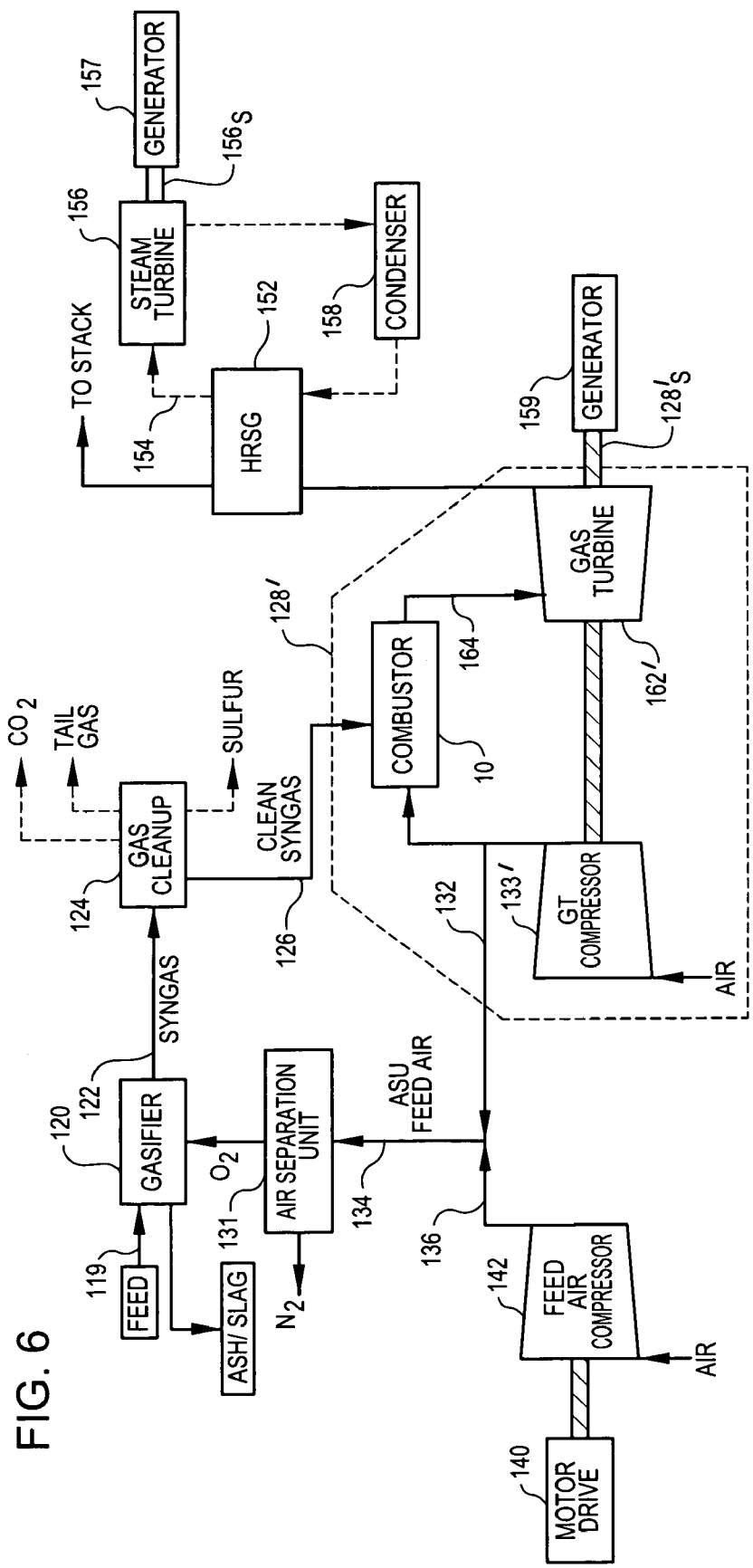
FIG. 6 provides a process flow diagram for a novel Integrated Gasification Combined Cycle ("IGCC") plant, showing the use of a novel trapped vortex combustor in a gas turbine, and also showing the elimination of use of selective catalytic reduction or similar process after the combustion of syngas in the gas turbine for NOx reduction, as well as the elimination of the use of nitrogen diluent to control NOx emissions from the gas turbine engine.

Referring now to FIG. 6, when employed in an IGCC plant, an air separation unit 131 is normally provided to separate air into a nitrogen rich stream and an oxygen rich stream. In such IGCC plant, the oxygen rich stream is provided as a feed stream to the gasification unit 120. In some embodiments, a motor 140 driven air compressor 142 may be provided to produce compressed air 134 for feed to the air separation plant 131. As noted in FIG. 5, in some embodiments, a compressor 142" having multiple compression stages and an intercooler 176 can be provided, and in such case, the process can be operated to recover the heat of compression from air compressed in the motor driven air compression plant 142". Further, nitrogen can be collected from the nitrogen rich stream exiting the air separation plant 131. In some embodiments, the nitrogen can be stored as compressed gas, or liquefied, and in any event, collected and either used elsewhere on site or sent off-site for sale.

In summary, whether for application for combustion of syngas from coal gasification, or for combustion of other high hydrogen content fuels, or for combustion of other gaseous fuels, a novel trapped vortex combustor design has now been developed, and initial tests have indicated that significant improvements in emissions may be attained in such a design. And, an important objective of the novel trapped vortex combustor design and operating strategy is to control such emissions. In one embodiment, NOx is expected to be controlled to about 15 ppmvd or lower. In another embodiment, NOx is expected to be controlled to 9 ppmvd or lower. In yet another embodiment, NOx is expected to be controlled to 3 ppmvd or lower. These emissions are stated in parts per million by volume, dry, at fifteen percent (15%) oxygen ("ppmvd").

As generally described herein, the novel trapped vortex combustor 10 described herein is easily adaptable to use in a power generation system. Where syngas is burned, the fuel composition may vary widely, depending upon the gasification process selected for use, but broadly, gaseous fuels may have a hydrogen to carbon monoxide mole percent ratio of from about 1/2 to about 1/1. More generally, the novel trapped vortex combustor 10 described herein may be sized and shaped for operation with a gaseous syngas fuel in a wide range of fuel compositions, and in various embodiments, may be utilized on syngas containing hydrogen, or more broadly, with fuels containing hydrogen in the range of from about fifteen (15) mole percent to about one hundred (100) mole percent.

The novel trapped vortex combustor 10 design described herein is a unique design which allows use of a gaseous fuel lean pre-mix, and is capable of handling the high velocity through flow necessary with hydrogen-rich fuels. The technology has experimentally proven to be very stable and exhibits both low pressure drop and low acoustic coupling throughout its operating range. It is believed that these capabilities can potentially allow a gas turbine combustor to burn hydrogen-rich syngas type fuels in a lean pre-mix mode without flashback. Further such an approach will enable the gas turbine combustor to meet the stringent emissions requirements without after-treatment, and without diluent gas. Such a configuration may also allow the retrofit of certain existing natural gas fired power plants to clean coal gasification operations, allowing for productive use of the assets currently considered "stranded" by the high cost of natural gas.

In the foregoing description, for purposes of explanation, numerous details have been set forth in order to provide a thorough understanding of the disclosed exemplary embodiments for a novel trapped vortex combustor, and power generation systems employing such a trapped vortex combustor. However, certain of the described details may not be required in order to provide useful embodiments, or to practice a selected or other disclosed embodiments. Further, the description includes, for descriptive purposes, various relative terms such as adjacent, proximity, adjoining, near, on, onto, on top, underneath, underlying, downward, lateral, base, ceiling, and the like. Such usage should not be construed as limiting. That is, terms that are relative only to a point of reference are not meant to be interpreted as absolute limitations, but are instead included in the foregoing description to facilitate understanding of the various aspects of the disclosed embodiments of the present invention. And, various steps or operations in a method described herein may have been described as multiple discrete operations, in turn, in a manner that is most helpful in understanding the present invention. However, the order of description should not be construed as to imply that such operations are necessarily order dependent. In particular, certain operations may not need to be performed in the order of presentation. And, in different embodiments of the invention, one or more operations may be eliminated while other operations may be added. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to this invention should be limited only by the claims set forth herein, and the legal equivalents thereof.

The invention claimed is:

1. A trapped vortex combustor, comprising:
 a pressurizable plenum oriented along an axis defining an axial direction, said pressurizable plenum comprising a base and containment walls, said containment walls comprising a ceiling;
 an oxidant inlet for receiving a gaseous oxidant;
 a fuel inlet for receiving a gaseous fuel, said gaseous fuel comprising hydrogen;
 a first bluff body, said first bluff body extending between said base and said ceiling and having a rear wall;
 a second bluff body, said second bluff body located downstream from said first bluff body, said second bluff body extending between said base and said ceiling and having a front wall;
 a mixing zone downstream of said gaseous fuel inlet, said mixing zone upstream of said rear wall of said first bluff body, said mixing zone having a length along said axial direction sufficient to allow mixing of said gaseous fuel and said gaseous oxidant to form a lean premixed fuel and oxidant mixture stream;
 wherein the pressurizable plenum, first bluff body, and second bluff body are sized and shaped to receive the premixed fuel and oxidant mixture stream at a velocity greater than the combustion flame speed resulting from combustion of the lean premixed fuel and oxidant mixture composition.

2. The combustor as set forth in claim 1, wherein said first fluff body and said second bluff body are spaced apart sufficiently to operably contain during combustion, one or more stabilized vortices of burning gases therebetween, so that during operation, one or more stabilized vortices of mixing and burning gas is trapped between said rear wall of said first bluff body and said front wall of said second bluff body.

3. The combustor as set forth in claim 2, further comprising one or more lateral struts extending outward from said first bluff body adjacent said rear wall of said bluff body.

4. The combustor as set forth in claim 3, wherein between said rear wall of said first bluff body and said front wall of said second bluff body, at least a portion of gases in said stabilized vortex of mixing and burning gas moves in opposition to the bulk fluid flow direction.

5. The combustor as set forth in claim 3, wherein the first and second bluff bodies are sized, shaped, and located such that during operation, between said rear wall of said first bluff body and said front wall of said second bluff body, at least a portion of gases in said stabilized vortex of mixing and burning gas moves in the bulk fluid flow direction.

6. The combustor as set forth in claim 5, further comprising one or more struts, said one or more struts extending outwardly from said first bluff body.

7. The combustor as set forth in claim 6, wherein said one or more struts comprises at least one pair of struts extending outward from opposing sides of said first bluff body.

8. The combustor as set forth in claim 7, wherein at least one of said at least one pair of struts comprises a planar rear portion.

9. The combustor as set forth in claim 8, wherein said planar rear portion is oriented coplanar with said rear wall of said first bluff body.

10. The combustor as set forth in claim 6, wherein said one or more struts comprise an upstream portion shaped for low aerodynamic drag.

11. The combustor as set forth in claim 1, wherein said pressurizable plenum is sized and shaped to receive, during operation, the lean premixed fuel and oxidant mixture at a velocity of at least 105 meters per second.

12. The combustor as set forth in claim 1, wherein said pressurizable plenum is sized and shaped to receive, during operation, the lean premixed fuel and oxidant mixture at a velocity of from about 105 meters per second to about 150 meters per second.

13. The combustor as set forth in claim 1, wherein said pressurizable plenum is sized and shaped to receive, during operation, the lean premixed fuel and oxidant mixture at a velocity of at least 150 meters per second.

14. The combustor as set forth in claim 1, wherein said combustor is sized and shaped to receive the lean premixed fuel and oxidant mixture at a bulk fluid velocity exceeding the flame speed of combustion occurring in the entering lean premixed gaseous fuel.

15. The combustor as set forth in claim 1, wherein said combustor is sized and shaped to receive the lean premixed fuel and oxidant mixture at a bulk fluid velocity exceeding the flame speed of combustion occurring in the entering lean premixed fuel and oxidant mixture from a factor of about 3 to a factor of about 6.

16. The combustor as set forth in claim 1, wherein said combustor comprises a first bluff body and a second bluff body, and wherein said first fluff body and said second bluff body are spaced apart sufficiently to operably contain during combustion, a stabilized vortex of burning gases there between, and wherein heat and combustion products produced in the stabilized vortex of burning gases are carried upstream by a recirculation zone to ignite lean premixed fuel and oxidant mixture entering the combustor.

17. The combustor as set forth in claim 1, wherein said combustor between said rear wall of said first bluff body and said second bluff body are spaced apart sufficiently to provide a cavity to operably contain a stabilized vortex of burning gases there between, and wherein said combustor further comprises at least one structure extending outwardly from at or near the rear wall of the first bluff body, said at least one structure immersed at least in part in the bulk fluid flow area adjacent the first bluff body, and wherein heat and combustion products produced in the stabilized vortex of burning gases are carried at least in part laterally adjacent the at least one outwardly extending structure, to ignite lean premixed fuel and oxidant mixture entering the combustor.

18. The combustor as set forth in claim 17, wherein said at least one outwardly extending structure comprises a strut.

19. The combustor as set forth in claim 17, wherein said at least one outwardly extending structure comprises at least one strut, each of said at least one struts protruding from a side of said first bluff body, at or adjacent the rear wall thereof.

20. The combustor as set forth in claim 17, wherein said at least one outwardly extending structure comprises one or more pairs of struts, each strut in each of said one or more pairs of struts protruding from said first bluff body, at or adjacent the rear wall thereof.

21. The combustor as set forth in claim 1, wherein said second bluff body further comprises one or more vortex stabilization jets, each of said one or more vortex stabilization jets providing an upstream jet of gas in a direction tending to stabilize the vortex in the cavity between the first bluff body and the second bluff body.

22. The combustor as set forth in claim 21, wherein said second bluff body is coupled to a source of fuel, and wherein at least one of said vortex stabilization jets comprises a stream containing fuel.

23. The combustor as set forth in claim 22, wherein said second bluff body is coupled to a source of syngas, and wherein said fuel comprises syngas.

24. The combustor as set forth in claim 21, wherein said second bluff body is coupled to a source of oxidant, and wherein at least one of said vortex stabilization jets comprises a stream containing an oxidant.

25. The combustor as set forth in claim 21, wherein said second bluff body is coupled to a source of fuel, and wherein at least one of said vortex stabilization jets comprises a stream containing a fuel, and wherein said second bluff body is coupled to a source of oxidant, and wherein at least one of said vortex stabilization jets comprises a stream containing an oxidant.

26. The combustor as set forth in claim 21, wherein said second bluff body is coupled to a source for a lean premixed fuel and oxidant mixture, and wherein at least one of said vortex stabilization jets injects a lean premixed fuel and oxidant mixture into the cavity between the first bluff body and the second bluff body.

27. The combustor as set forth in claim 21, wherein the first and second bluff bodies are sized, shaped, and spaced apart in a manner that when in operation, the heat and combustion products produced during combustion of the lean premix are continuously recirculated in a recirculation zone in the cavity between the first and second bluff bodies, and wherein heat and combustion products exit transversely from the cavity and are employed to continuously ignite a lean premixed fuel and oxidant mixture entering the combustor.

28. The combustor as set forth in claim 17, or in claim 27, wherein NOx is controlled to 15 ppmvd or lower.

29. The combustor as set forth in claim 17, or in claim 27, wherein NOx is controlled to 9 ppmvd or lower.

30. The combustor as set forth in claim 17, or in claim 27, wherein NOx is controlled to 3 ppmvd or lower.

31. The combustor as set forth in claim 1, wherein said gaseous fuel comprises at least 15 percent hydrogen.

32. The combustor as set forth in claim 1, wherein said gaseous fuel comprises at least 25 percent hydrogen.

33. The combustor as set forth in claim 1, wherein said gaseous fuel comprises at least 30 percent hydrogen.

34. The combustor as set forth in claim 1, wherein said gaseous fuel comprises at least 50 percent hydrogen.

35. The combustor as set forth in claim 1, wherein said gaseous fuel comprises at least 65 percent hydrogen.

36. The combustor as set forth in claim 1, wherein said gaseous fuel comprises 75 percent or more hydrogen.

37. The combustor as set forth in claim 1, wherein said gaseous fuel comprises about 100 percent hydrogen.

38. The combustor as set forth in claim 1, wherein said combustor comprises a base, and wherein said first bluff body extends from said base for a distance $Y_1$, and wherein said second bluff body extends outward from the base for a distance $Y_2$, and wherein distance $Y_1$ is equal to distance $Y_2$.

39. A gas turbine engine, said gas turbine engine comprising:
- a compressor;
- a gas turbine;
- a trapped vortex combustor, said trapped vortex combustor comprising a pressurizable plenum, said pressurizable plenum comprising a base and containment walls, said containment walls;
- an oxidant inlet for receiving a gaseous oxidant;
- a fuel inlet for receiving a gaseous fuel, said gaseous fuel comprising hydrogen;
- a first bluff body, said first bluff body extending from the base and having a rear wall;
- a second bluff body, said second bluff body located downstream from said first bluff body, said second bluff body extending from the base and having a front wall;
- a mixing zone downstream of said gaseous fuel inlet, said mixing zone upstream of said rear wall of said first bluff body, said mixing zone having a length to allow mixing of said gaseous fuel and said gaseous oxidant to form a lean premixed gaseous fuel and oxidant mixture comprising an excess of oxidant;
- wherein the pressurizable plenum, first bluff body, and second bluff body are sized and shaped to receive the lean premixed gaseous fuel and oxidant mixture at a velocity greater than the combustion flame speed resulting from combustion in the lean premixed gaseous fuel and oxidant mixture composition; and
- wherein said rear wall of said first bluff body and said front wall of said second bluff body are spaced apart sufficiently to form a cavity there between to operably contain during combustion one or more stabilized vortices of burning gases, and wherein said combustor further comprises at least one structure extending outward from at or near the rear wall of the first bluff body, and wherein heat and combustion products produced in the one or more stabilized vortices of burning gases are carried away from said rear wall of said first bluff body, behind said at least one structure extending outward, to ignite lean premixed fuel and oxidant mixture entering the trapped vortex combustor.

40. The gas turbine engine as set forth in claim 39, wherein said second bluff body further comprises one or more vortex stabilization jets.

41. The gas turbine engine as set forth in claim 40, wherein each of said one or more vortex stabilization jets provides a jet in a direction tending to stabilize at least one of the one or more stabilized vortices in the cavity between the first bluff body and the second bluff body.

42. The gas turbine engine as set forth in claim 40, wherein said second bluff body is coupled to a source of fuel, and wherein at least one of said one or more vortex stabilization jets delivers to said cavity a stream containing a fuel.

43. The gas turbine engine as set forth in claim 40, wherein said second bluff body is coupled to a source of oxidant, and wherein at least one of said one or more vortex stabilization jets delivers to said cavity a stream containing an oxidant.

44. The gas turbine engine as set forth in claim 40, wherein said second bluff body is coupled to a lean premixed fuel and oxidant mixture source, and wherein at least one of said one or more vortex stabilization jets injects a lean premixed fuel and oxidant mixture stream into the cavity between the first bluff body and the second bluff body.

45. The gas turbine engine as set forth in claim 39, wherein the first and second bluff bodies are sized, shaped, and spaced apart in a manner that when in operation, the heat and combustion products produced during combustion of the lean premix are continuously recirculated in a recirculation zone in the cavity between the first and second bluff bodies, and wherein heat and combustion products circulate from the cavity in a direction having a lateral directional component and wherein said heat and combustion products are employed to continuously ignite a lean premixed gaseous fuel and oxidant mixture entering the trapped vortex combustor.

46. The gas turbine engine as set forth in claim 39, wherein NOx is controlled to 15 ppmvd or lower.

47. The gas turbine engine as set forth in claim 39, wherein NOx is controlled to 9 ppmvd or lower.

48. The gas turbine engine as set forth in claim 39, wherein NOx is controlled to 3 ppmvd or lower.

49. The gas turbine engine as set forth in claim 39, wherein said trapped vortex combustor operates without diluent gas addition.

50. The gas turbine engine as set forth in claim 39, wherein said gaseous fuel comprises at least 15 mole percent hydrogen gas.

51. The gas turbine engine as set forth in claim 39, wherein said gaseous fuel comprises at least 25 mole percent hydrogen gas.

52. The gas turbine engine as set forth in claim 39, wherein said gaseous fuel comprises at least 30 mole percent hydrogen gas.

53. The gas turbine engine as set forth in claim 39, wherein said gaseous fuel comprises at least 50 mole percent hydrogen gas.

54. The gas turbine engine as set forth in claim 39, wherein said gaseous fuel comprises at least 65 mole percent hydrogen gas.

55. The gas turbine engine as set forth in claim 39, wherein said gaseous fuel comprises 75 mole percent or more hydrogen gas.

56. The gas turbine engine as set forth in claim 39, wherein said gaseous fuel comprises about 100 mole percent hydrogen gas.

57. The gas turbine engine as set forth in claim 39, wherein said trapped vortex combustor is sized and shaped for operation with a gaseous fuel comprising hydrogen in the range of from about 15 mole percent to about 75 mole percent.

* * * * *

UNITED STATES PATENT AND TRADEMARK OFFICE
CERTIFICATE OF CORRECTION

PATENT NO. : 7,603,841 B2  Page 1 of 1
APPLICATION NO. : 11/365969
DATED : October 20, 2009
INVENTOR(S) : Robert C. Steele et al.

It is certified that error appears in the above-identified patent and that said Letters Patent is hereby corrected as shown below:

Column 4, line 17, after the words "be generated in", delete "on" and substitute therefor --one--.
Column 6, line 16, after the words "more stabilized vortices", delete "26" and substitute therefor --24--.
Column 6, line 27, after the words "tending to stabilize vortex", delete the words "22 and vortex 24" and substitute therefor --24 and vortex 26--.
Column 6, line 57, after the words "mixture entering the", delete "tapped" and substitute therefor --trapped--.
Column 6, line 58, after the words "premixed fuel", delete "an" and substitute therefor --and--.
Column 7, line 26, after the words "fuel velocities", delete "allow" and substitute therefor --allows--.
Column 7, line 27, after the words "protection against", delete "flash back" and substitute therefor --flashback--.

Column 12, line 65, delete "fluff" and substitute therefor --bluff--.
Column 13, line 59, after the words "wherein said first" delete "fluff" and substitute therefor --bluff--.
Column 14, line 3, delete "there between" and substitute therefor --therebetween--.
Column 14, line 16, after the words "each of said at least one", delete "struts" and substitute therefor --strut--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO.      : 7,603,841 B2
APPLICATION NO. : 11/365969
DATED           : October 20, 2009
INVENTOR(S)     : Steele et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Fifth Day of October, 2010

David J. Kappos
*Director of the United States Patent and Trademark Office*